United States Patent Office 3,428,334
Patented Feb. 18, 1969

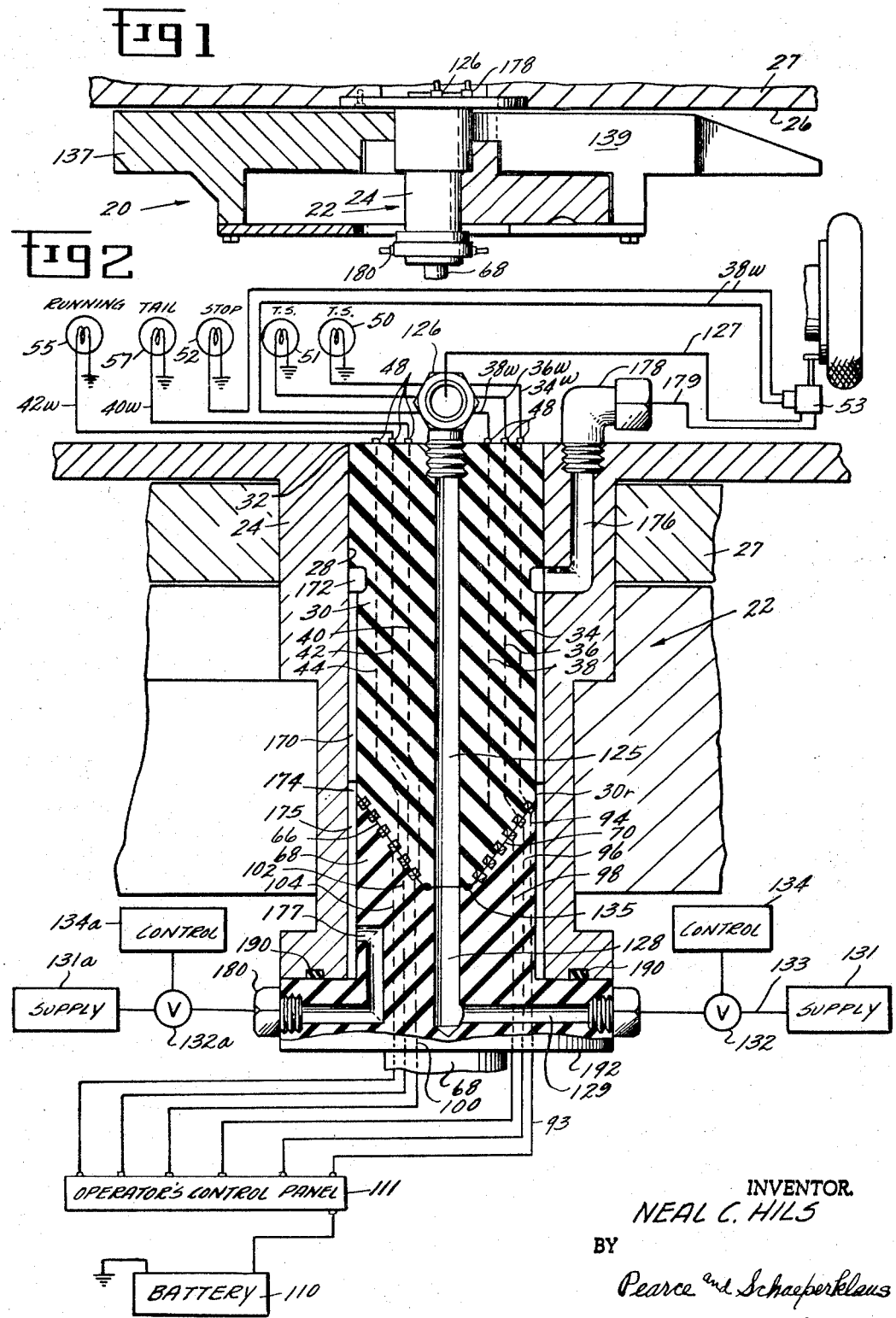

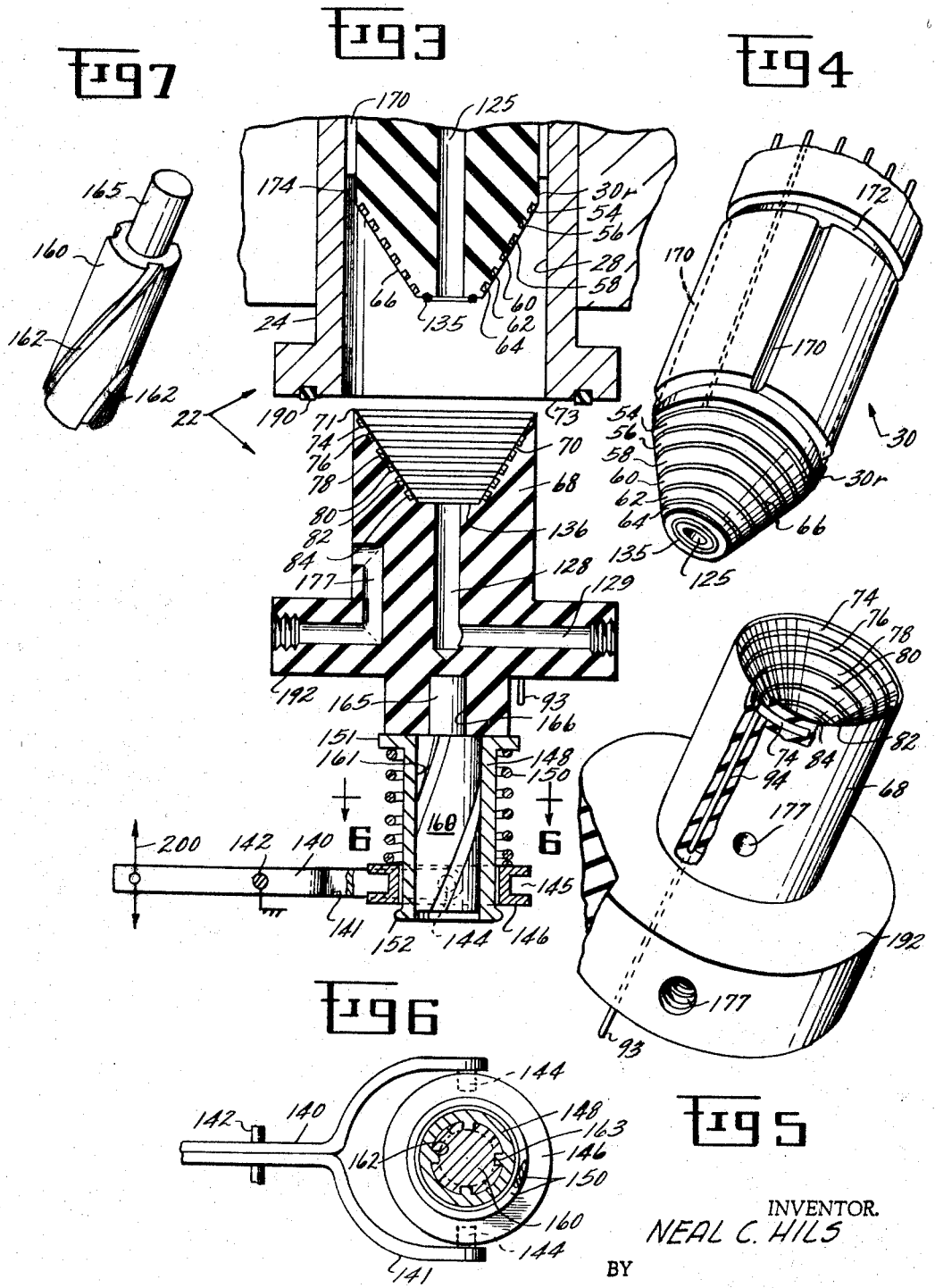

3,428,334
VEHICLE ARTICULATING COUPLING WITH ELECTRICAL AND FLUID SERVICE LINE CONNECTORS
Neal C. Hils, Cincinnati, Ohio, assignor of one-half to John V. Naidenoff, Elyria, Ohio
Filed Oct. 17, 1966, Ser. No. 587,230
U.S. Cl. 280—421      12 Claims
Int. Cl. B60d 1/08; H02g 11/02; F16l 3/00

ABSTRACT OF THE DISCLOSURE

An articulating coupling made up of a combination of elements through which electrical and pneumatic systems are respectively connected together upon coupling of such elements. Such combination is adapted to articulating vehicular movements, and comprises a kingpin or casing, an insulating material plug press fit in the bore of such kingpin or casing, and an insulating material member of less diameter than that of such bore cooperatively engaging the plug. Two independent pneumatic passageways are provided through the plug and member, and an electrical system of leads and ring contacts are provided between plug and member, whereby upon joining of the kingpin or casing, plug and member together, the articulating coupling is affected.

---

This invention relates to automatic connecting features adaptable to a tractor-trailer and/or other vehicular combinations, and is particularly related to an automatic connection or articulating coupling between components for electrical and pneumatic systems provided and required in such combinations.

An object of this invention is to provide for a novel electrical system for a vehicular combination, particularly with respect to a trucking unit comprising a tractor and trailer in tandem.

Another object of this invention is to provide for a novel pneumatic air system for a vehicular combination, such as a braking or other communication system, and particularly with respect to a trucking unit comprising a tractor and trailer in tandem.

Another object of this invention is to provide for a novel connection of electrical and/or pneumatic systems between a tractor and a trailer or other prime-mover and tandem vehicle moved thereby.

Another object of this invention is to provide for elimination of otherwise necessary manual connecting of electrical and pneumatic systems required between a prime-mover and its trailer or other tandem vehicle, thereby reducing time, labor and costs in maintaining operation of a trucking unit or other moving units.

Particularly in the freight-moving trucking industry, generally it is the responsibility of the driver of a tractor-trailer unit to correctly ascertain and maintain proper operability of electrical and pneumatic systems employed on the over-all unit for safety, driving, signalling, and braking purposes desired for effecting safety and proper utilization of the unit on roads and highways. Presently, this is accomplished by independent manual connections of appropriate hosing couplings between tractor and trailer after a kingpin mounted on the trailer and a fifth wheel mounted on the tractor are engaged and a locking mechanism applied between the kingpin and fifth wheel. The use and connection of a kingpin and fifth wheel are well known in the trucking industry, and various mechanical locking mechanisms therefor, also known in the industry, are utilized therewith. The indicated manual connections are made by coupling pneumatic hose elements attached to the tractor to fittings mounted at the front end of the trailer, all done independently of a king-pin and fifth wheel physical relationship. Likewise, connection of insulated electrical wiring leads extending from the tractor to contacts secured at the front end of the trailer, is also done manually by the driver, and done independently of a kingpin and fifth wheel relationship. These steps take time, and the truck driver thereby is not able to utilize such time in the actual driving of the vehicle towards its destination; or when he has reached his destination, time is required to disconnect electrical and pneumatic systems between tractor and trailer before separating the former from the latter. Consequently, a higher cost factor for operation of the unit is involved when the driver must take this time to connect and disconnect such systems. His effective driving time on the road between docking stations is less than otherwise desired.

Furthermore, the electrical systems are often connected erroneously with the result of no operable signals or perhaps, operation of directional signals is reversed. For example, a signal actuated by control in the cab of a tractor for moving or turning to the right may actuate left turn signal lights on the rear of the trailer, leading to a dangerous condition, particularly with respect to other vehicles in the immediate area whose drivers rely on a trailer's actuated turn signals. Obviously, with no signals or incorrectly given signals, collisions, mechanical damages, and personal body injuries can result. The advantages in my invention eliminate these hazards by the automatic connection of the electrical systems for the entire trucking unit, and which are provided by the mere hook-up of tractor and trailer, the driver not being required to make manual electrical connections.

As to connection of conventional pneumatic hose couplings, the possibility of unsecured couplings to fittings and the like is always present. By my invention, no human error can occur, clearly another advantage.

These and other objects and advantages will be apparent to those skilled in the art to which this invention pertains, or with which it is most nearly connected, by a reading of the following description, appended claims thereto, and the accompanying drawing comprising two sheets and in which:

FIG. 1 is an elevational view in section generally, illustrating a conventional connection of a kingpin to a fifth wheel and to which my invention is adaptable;

FIG. 2 is a elevational view, partly in section and including diagrammatic data, of a device embodying my invention;

FIG. 3 is an elevational view of a device embodying my invention and in which elements are shown to be in disconnected inoperable condition compared to a connected condition for making the device operative;

FIG. 4 is a perspective view of means in a device embodying my invention;

FIG. 5 is a perspective view of another means in the device embodying my invention;

FIG. 6 is a view taken on line 6—6 of FIG. 3; and

FIG. 7 is a perspective view of one element of a means preferably provided for facile connection or engagement of elements in my invention one to another for making operable a preferred embodiment of my invention.

Referring now again to the drawing in which reference characters identify and correspond to like reference characters in the following description, 20 refers to a conventional fifth wheel-kingpin arrangement in which my device 22 embodying the invention can be and, for the purpose of setting forth the best mode for the invention that I have contemplated, is situated. FIG. 1 is illustrated for the purpose of showing general disposition of my device 22 in a fifth wheel-kingpin environment. It should be understood that my device 22 is operatively mountable in relation to any conventional and known kingpin-fifth wheel arrangement found in the trucking industry and the art today.

A casing or kingpin 24, suitably affixed to the underside 26 of a trailer body 27 at its front end, is provided with a bore 28 (FIG. 2) extending throughout its length. A plug or means 30 of insulating material, preferably made of Formica or like material because of inherent insulating properties therein, is fixedly secured or mounted in bore 28, preferably by a tight frictional or press fit. Plug 30 is preferably of less length than that of kingpin 24, and extends preferably from inner end 32 of bore 28 to generally midway the length of bore 28. In other words, means 30 is disposed in an area that can be defined as the kingpin proper. Means 30 comprises a cylindrical member having disposed longitudinally therein a plurality of independent electrical leads 34, 36, 38, 40, 42, 44, . . . , each of such leads terminating at inner end 32 for the purpose of connection to electrical systems previously incorporated into trailer 27. Suitable electrical connecting means 48 is readily affixable inside the interior of trailer 27 in order to connect each of the plurality of leads 34, 36, . . . , to loads in the trailer's total electrical system. As shown diagrammatically in FIG. 2, lead 34 is connected by an electrical wire 34w to a turn signal (T.S.) means 50 suitably mounted, say, in the trailer's rear vertical panel on its right. Lead 36 is connected by a wire 36w to a turn signal means 51 suitably mounted on the trailer's rear panel on its left. Lead 38 is connected through a wire 38w to a stop light means 52 mounted on the trailer's rear via a wheel brake cylinder or cylinders 53. This electrical connection through cylinder 53 is provided for in a conventional manner well known in the art. Lead 40 is connected through a wire 40w to a tail light means 57 generally mounted on the rear panel of trailer 27. Lead 42 is connected through a wire 42w to running lights 55 generally mounted on trailer 27. One or more extra leads 44 is provided in means 30 for auxiliary purposes. Say, for example, that another lead was not functioning properly, then lead 44 would be available for use to complete the necessary electrical system.

The particular manner of wiring from each lead 34, 36, . . . to its corresponding load or light means may be accomplished in well known ways acceptable to the trucking industry and practiced in the electrical arts, and it is believed that it is not necessary to describe in detail the particular manner of arrangement concerning the above described known electrical features on trailer 27, since a mechanic ordinarily skilled in the art could make necessary connections between said leads and load means from a point in trailer 27 at where end 32 is located.

Each of independent leads 34, 36, . . . also terminates at the other end of means 30, independently one from another (FIGS. 2, 3, 4). Attached to each such lead and preferably made integral therewith, is a conducting ring 54, 56, 58, 60, 62, 64, . . . , respectively, each disposed in such end in a concentric and parallel fashion and also independently of each other. This end of means 30 is preferably tapered as at 66, for purposes described hereinafter. Each of these rings constitutes an electrical contact readily engageable with a like set of corresponding independent rings 74, 76, 78, 80, 82, 84, . . . , disposed in a cylindrical member 68 freely rotatable in and adapted to engage, abut, or register with means 30 in bore 28. As shown in FIGS. 4, 5, and diagrammatically in FIG. 2, the plurality of rings 54, 56, 58, 60, 62, 64 are disposed on member 30 so that their respective concentricities correspond to the concentricities of rings 74, 76, 78, 80, 82, 84, respectively, on member 68. Consequently, as means 30 and member 68 engage, abut, or register with each other in bore 28, electrical contact is made between the indicated corresponding concentrically disposed rings. Member 68 is provided with a reverse taper as at 70 (FIG. 3) corresponding to taper 66 on means 30, so that rings 74, 76, . . . , cooperate with their corresponding rings on means 30 when means 68 and 30 engage each other.

It should now be apparent that as many additional electrical rings on means 30 and member 68 will be necessary as there are additional auxiliary circuits desired for the united electrical system in the tractor-trailer unit. Furthermore, member 68 is preferably fabricated from Formica, as is the case with means 30, to insulate each of electrical leads 94, 96, . . . , rather than to insulate each electrical lead 94, 96, . . . .

Each of the plurality or rings 74, 76, . . . , are attached, or made preferably integral therewith, to electrical leads 94, 96, 98, 100, 102, 104, . . ., (FIG. 2), respectively, disposed generally lengthwise of member 68. Each of leads 94, 96, . . . , is independent of each other and projects exteriorly of member 68, as singularly illustrated in FIGS. 3 and 5 at 93 for lead 94, for expedient attachment by further electrical wiring to a battery 110 mounted in conventional fashion elsewhere on the tractor, to complete respective electrical circuits for the load and light means on trailer 27.

The following example, applicable to all corresponding electrical circuits, demonstrates the functioning of one of the electrical circuits in the trucking unit when my device is in operable condition. Electrical energy from battery 110 passes through wire 94 to ring 74, to ring 54 engaging ring 74, to lead 34, to wire 34w, to turn signal 50 thereby actuating same, and thence to ground completing the circuit. An operator's control panel 111 is shown merely to indicate that the operator of a tractor can have knowledge that any or all circuits are functioning properly or improperly, although such panel is not necessary to the invention. It is apparent that for operational use these circuits can be placed in parallel with each other.

Means for a pneumatic circuit system is provided by and in the combination of a kingpin 24, a means 30 and a member 68. A bore 125 is provided in kingpin 24, preferably in a means 30 included in kingpin 24, extending throughout its length. A conventional fitting 126 is mounted at end 32 for coupling bore 125 to an air brake system on trailer 27, symbolized by wheel cylinder 53 and a pneumatic line 127. The other end of bore 125 is adapted to register with a like bore 128 disposed longitudinally in member 68. A second bore 129 is also disposed in member 68 and directly communicates with bore 128, the juncture of which bores is preferably disposed below the base 73 of kingpin 24 when member 68 is engaged in operable condition with kingpin 24. Furthermore, bore 129 is preferably horizontally disposed in member 68 and extending radially outwardly thereof to terminate at its surface. Bores 125, 128 and 129 constitute fluid passageways for conducting pneumatic fluid, such as compressed air, from a supply source, such as a compressor unit 131 normally found on tractors, to the pneumatic air brake systems on trailer 27. A valve 132 is mounted in a fluid line 133 between bore 129 and source 131, being controlled as at 134 in the cab of the tractor in a conventional manner for vehicular combinations such as those involved here.

Sealing means such as an O-ring 135 is preferably provided for bores 125 and 128 upon engagement of member 68 to plug 30, in addition to the preferred tapers 66 and 70, in order to eliminate loss of communicable fluid under pressure being transmitted between such bores. O-ring 135 is preferably mounted at the terminus of taper 66 on plug 30 and cooperates with a base 136 (FIG. 3), provided at the bottom of the reverse taper 70 of member 68, upon registry with means 30.

It should now be apparent that for purposes of this primary pneumatic circuit, bores 128 and 129 are one and the same in essence, and that FIG. 2 illustrates a preferred form for member 68 in which bores 128 and 129 are disposed so that facile connection to a pneumatic supply source 131 can be clearly disclosed in the drawing.

Means is provided for advancing member 68 into bore 28 for registry or cooperative engagement with means 30.

As shown in FIGS. 3, 6, a forked member 140 comprising a bow 141 is pivotably connected, as at 142, to a housing member (not shown) or other frame elements welded to the frame for and disposed below a fifth wheel 137 (FIG. 1) mounted on the tractor. Each leg of bow 141 includes a lug 144 diametrically opposed to the lug on the opposite leg of bow 141. Each lug 144 rides within an annular recess 145 provided on a collar 146 loosely fitting about a sleeve 148 abutting member 68. A biasing spring 150 is mounted about sleeve 148, and is disposed therealong between collar 146 and suitable means such as an annular boss 151 provided on sleeve 148. A second annular boss 152 may be provided at the free end of sleeve 148 for retaining collar 146 thereabout. Thus, as forked member 140 is pivoted at 142, collar 146 is advanced (upwardly in FIG. 3) against spring 150 whose reaction provides for advancement of sleeve 148 and member 68 into bore 28.

The arrangement immediately previously described provides for a further advantage, namely, that of a resilient cooperative engagement between means 30 and member 68, for use of either or both electrical and pneumatic circuits flowing therethrough.

It should be remembered that during operation on a road bed of a tractor-trailer unit, various kinds of forces are applied to or react between the mechanical connection of fifth wheel and kingpin, resulting in oscillatory, up-and-down relative movement and the like in such connection. It is not unreasonable to assume that like forces would apply to or react between means 30 and member 68 and as a consequence, break electrical connection between rings 54, . . . , 64, . . . , and rings 74, . . . , 84, . . . , mounted on and between means 30 and member 68, and also break apart conduits 125, 128. Therefore, the upward biasing force provided by spring 150 after bow 141 has pivoted upwardly maintains a thrust on member 68 to continually engage or register with means 30. Thus, physical contact between the indicated electrical rings and pneumatic conduits is maintained, while at the same time, such spring biasing force provides for resiliency of movement in member 68 at a moment of downward force imparted through kingpin 24 and means 30. The necessary cooperative relationship of means 30 to member 68 for proper operation is nevertheless maintained.

It should now be apparent that means are provided for advancing member 68 into bore 28 for cooperative relationship with means 30, and that the invention, illustrated by FIG. 3, comprehends a means for eliminating separation of means 30 and member 68 during actual use in a tractor-trailer unit so as to remain in operable condition.

A suitable means 200, such as a servomechanism, solenoid switch means or the like can be readily fashioned for actuating forked member 140 about its pivot point 142, and thereafter maintain member 140 in pivoted position to effect continual engagement of member 68 with kingpin 24. Pivot 142 is suitably mounted on the tractor frame below fifth wheel 137 (FIG. 1) so that member 68 is aligned centrally of the apex of V-shaped cavity 139 conventionally associated physically with and in fifth wheel 137 whereby kingpin 24 on tractor 27 is linearly guided into its locking position centrally thereof. It should be understood that means 200 is not limited to any one particular element or elements, as any suitable mechanism can be employed.

Further, although not shown in the drawing, a housing or the like may be utilized for aligning and maintaining member 68 in its generally proper position below fifth wheel 137 incident to utilization of the claimed combination in operable and inoperable condition. There is ample space below fifth wheel 137 and its mounting proper to the frame of a tractor, and in which a housing or other support for member 68 can be secured such as by welding.

Means for an effective initial coupling between means 30 and member 68 is provided in the preferred embodiment, as illustrated in FIGS. 3, 6, 7. Preferably, a helically splined shaft 160 is mounted in a hollow bore 161 provided in sleeve 148. Shaft 160 comprises one or more helically wound grooves 162 peripherally mounted along its length. Grooves 162 are keyed to a corresponding key element or elements 163 integrally formed in the wall of bore 162 of sleeve 148. A reduced head 165 on shaft 160 is press fit to or otherwise suitably made secure in a bore 166 provided in member 68. During the initial coupling stages of member 68 to means 30 in bore 28 of kingpin 24, the axes of member 68 and bore 28 may not be coincident to provide for frictionless entrance of the former into the latter. For example, kingpin 24 first engages its fifth wheel 137 in a conventional or known manner. In the step of introduction of member 68 into bore 28, top rim 71 (FIG. 3) of member 68 may strike the bottom 73 of kingpin 24 in their initial momentary engagement as forked bow 141 is pivoted upwardly and as a result of member 68 being mounted on sleeve 148 loosely seated in collar 146. Consequently, were a rotating frictional action developed at the instance of mechanical contact between bottom 73 and rim 71, member 68 would follow its least line of resistance, which is towards a true centering thereof with bore 28, i.e., coincidence of their axes. This desired rotating frictional action is achieved as a result of splined shaft 160 rotating on its axis via keyed grooves and elements 162, 163. During initial moments of axial movement, sleeve 148 can be said to be rigid in movement with member 68 as a result of the upward force exerted by compressed spring 150 against boss 151 and member 68 and the reactionary downward force by kingpin 24 through its bottom 73 (FIG. 3), onto rim 71 of member 68. The ultimate result is now apparent, viz, that member 68 properly seats in bore 28 with the heretofore described electrical and pneumatic elements in their respective cooperative relationships.

Another pneumatic system between a tractor and trailer unit is included in this embodiment of the invention, although conceivably the elements constituting either pneumatic system may be utilized without the inclusion of the elements in the other system. In this particular embodiment, this second system is employed as an emergency system in the event the heretofore described pneumatic system would become ineffective.

As illustrated in FIGS. 2, 3, and 4, plug means 30 is provided with one or more peripherally disposed grooves 170 extending longitudinally therealong. The ends of grooves 170 disposed towards inner end 32 communicate with an annular groove 172 formed circumferentially in means 30, while the other ends of grooves 170 communicate with a circumferential space 174 formed as a result of a reduced portion 30r formed adjacent the beginning of taper 66 on means 30. It should now be noted from FIGS. 2 and 3 that the portion of member 68 adapted to be inserted in bore 28 is of a smaller diameter than that of bore 28, thereby providing for an annular space 175 linearly disposed with space 174 along the wall defining bore 28 during the cooperative relationship of member 68 with means 30. These grooves 170, 172 and spaces 174, 175 constitute passageways communicable with, on the one hand, a passageway 176 formed in the wall of kingpin 24 (FIG. 2) and on the other hand, a passageway 177 formed in member 68. Passageway 176 terminates at a fitting 178 attached to kingpin 24 for the purpose of connection to pneumatic lines, such as illustrated by a line 179 to wheel cylinder 53 on tractor 27, in the same fashion and for the same purposes as was stated hereinbefore pertaining to the first described pneumatic system. Passageway 177 terminates at a fitting 180 attached to member 68 for the purpose of connection to pneumatic lines mounted on a tractor and leading to elements 131a, 132a, 134a in the same fashion and for the same purposes as was stated hereinbefore pertaining to the first described pneumatic system in relation to elements 131, 132, and 134. Elements 131, 132, 134 and 131a, 132a, 134a may be one and the same, respectively.

It should now be apparent that a second pneumatic system between a tractor and trailer unit is established by the indicated passageways and by which air under pressure is transmitted between the tractor and trailer constituting the vehicular unit.

Sealing means, such as an O-ring 190, are mounted in base 73 of kingpin 24 for engagement with an annular boss 192 integrally formed of member 68, thereby providing for an effective pneumtic seal for the secondary remaining, bores 125, 128 and/or elements 172, 170 kingpin 24.

It should now be apparent that my inventive concept embraces the use of a pneumatic system exclusive of use of an electrical system, and vice versa, through the cooperative engagement of a member 68 with a bore 28 in kingpin 24, although the preferable mode is the inclusion of both as shown in this embodiment. Either the electrical elements or the pneumatic elements heretofore described may be omitted to the exclusion of the other, and nevertheless provide for operation of the system remaining. In the case of the pneumatic system remaining, bores 125, 28 and/or elements 172, 170 and 174 would be required to be incorporated in kingpin 24, while bores 128, 129 and/or bore 177 and space 175 would be respectively required in member 68. In the case of the electrical system remaining, leads 34, 36, 38, . . . and rings 54, 56, 58, . . . , would be required to be insulatedly mounted in a kingpin proper, the kingpin having a bore 28 (FIG. 3) disposed towards rim 73, while leads 94, 96, 98 . . . and rings, 74, 76, 78, . . . would be required to be insulatedly mounted in member 68 for cooperative engagement with the leads and rings mounted in the kingpin proper. Insulation can take the form of Formica material utilized for member 68 and for an element similar to plug means 30, or in the alternative for insulation of leads 34, 36, 38, . . . and rings 54, 56, 58, . . . , each such lead and ring can be separately insulated from a metal kingpin 24 by insulated coatings suitable for electrical wiring.

OPERATION

In the practical environment of a tractor-trailer unit, a fifth wheel 137 mounted on a tractor is directed into connection with kingpin 24 mounted on trailer 27, with member 68 remaining in a disposition below kingpin rim 73 until the mechanical connection of kingpin and fifth wheel is joined. Thereafter, member 68 is linearly actuated upwardly towards kingpin bore 28 by the mechanisms on both sides of pivot point 142, with means 200 pivoting in a counterclockwise manner (downwardly). As forked member 141 pivots upwardly, loosely disposed collar 146 reacts against spring 150 simultaneously compressing same and causing sleeve 148 to advance upwardly and frictionally engage member 68. As loosely disposed collar 146 is axially displaced, splined shaft 160 begins to rotate as a result of being keyed at 162 of sleeve 148. Member 68, in fixed relationship to splined shaft 160, also rotates therewith, the rotation of shaft 160 creating sufficient force to overcome the frictional engagement between annular boss 151 on sleeve 148 and member 68 resulting from the compression of spring 150. In the event edge 71 on member 68 strikes kingpin rim 73, the rotational movement imparted to member 68 causes it to seek a line of least resistance to the friction developed. Now, the particular embodiment includes a loosely disposed mounting of member 68, shaft 160, and sleeve 148 upon its immediate actuating elements, namely, collar 146 and spring 150. Consequently, such loosely disposed mounting provides for an adequate tilting or play of member 68 about the central longitudinal axis of kingpin 24 so that the line of least resistance for member 68 to follow, upon striking rim 73, is insertion into kingpin bore 28. Thereafter, the continuing followthrough of pivoting of forked member 140 about its pivot 142, as a result of a completed cycle of means 200, causes kingpin 24 and member 68 to be engaged in operable condition, namely, by the physical engagement and cooperative relationship of means 30, member 68, and their respective and corresponding electrical and pneumatic components.

Release of the operable condition of kingpin 24 and member 68 is obvious by providing for reverse pivotal action of means 200, whereby forked member 140 pivots in a clockwise fashion thereby withdrawing member 68 from kingpin bore 24.

It should now be apparent that the cooperation of rings 54, 56, . . . and 74, 76, . . . , respectively, and of conduits 125 and 128, during operable condition of device 20, in no way prevents turning movement between tractor and trailer as the unit traverses curves, bends, corners, and the like as it traverses its roadbed. As an example, when a tractor turns a corner, fifth wheel 137, being fixedly mounted thereon, rotates about kingpin 24. Nevertheless, the operable condition of device 20 does not become inoperative because of rotation of member 68 in bore 28. The indicated rings and conduits remain engaged. It is now observable also that not only is an auxiliary pneumatic circuit included in this preferred embodiment, by providing for space 175 as a result of the smaller diameter of member 68 relative to the diameter of bore 28, but that such smaller diameter of member 68 provides for independent rotary reaction between kingpin 24 and fifth wheel 137 under and for all driving conditions.

The preferred embodiment of the invention, as described, contemplates use of means 30 and member 68 in the form of Formica or like insulating material, with both the electrical and pneumatic elements as described above running therethrough. However, in the event the electrical system and elements constituting same are omitted, then only conduits 125, 128, 129, 176, 177 and grooves 170, 172 along with that portion of bore 28 into which member 68 is inserted and disposed for operable condition of device 20, is required to be cut out of casing or kingpin 24 rather than to supply casing of kingpin 24 with a means 30, for the purpose of providing for unity of a pneumatic system between the tractor-trailer or other vehicle combination, although it is obvious from a prefabrication viewpoint, a means 30 (not necessarily of insulating material) may be preferable. In the event the pneumatic system and elements constituting the same are omitted, and a means 30 and member 68 of insulating material is not used, kingpin 24 and member 68 may be drilled with holes into which insulated electrical leads may be inserted and disposed, while rings 54, 56, . . . and 74, 76, . . . are insulatedly mounted on their respective elements 30 and 68. Again, it appears advantageous at this time in use of the electrical system that a means 30 and member 68 of insulating material be used for prefabrication purposes.

It is also conceivable that means 30 may extend beyond rim 73 of kingpin 24 and nevertheless be coupled to a member 68. Also, a reverse taper, such as shown at 70 on member 68, can be included in means 35 with a corresponding taper, such as shown at 66 on means 30, included on member 68.

My concept contemplates use of my invention on combinations of elements other than a tractor-trailer combination in which elements lie to each side of the claimed combination and in which conventional pneumatic and electrical components are incorporated and adapted to be otherwise joined, whereby the result achieved in use of my claimed invention with such components is an automatic connecting of such components.

Pursuant to the requirements of the patent statutes, the principle of this invention has been explained and exemplified in a manner so that it can be readily practiced by Therefore, what I claim as patentably novel is:

1. The combination of:

a casing having a bore therethroughout, a plug secured in said casing bore, said plug being of less length than said casing and comprising (a) an annular groove on said plug, and (b) at least one peripheral groove on said plug, extending longitudinally therealong, and connected with said annular groove, means cooperatively engaging said plug in said bore and comprising (a) a member of less diameter than the diameter of said casing bore whereby an annular space is defined in said casing bore below said plug, and (b) a bore in said member communicable at its one end with the annular space and adapted at its other end for connection with a pneumatic pressure source, the annular space communicable with the peripheral groove, the annular groove, peripheral groove, annular space, and member bore constituting conduits forming a passageway for the pneumatic system, means for sealing said casing and member to prevent leakage from the passageway, said plug also including:

at least one electrical lead insulated in and extending throughout said plug, an electrically-conducting ring mounted on said end of said plug and attached to said lead, said member also including:

an end adapted for disposition in said casing bore, and at least one electrical lead extending therethroughout, an electrically-conducting ring mounted on said end and attached to the last mentioned electrical lead, said plug and member engaging each other in said casing bore whereby each electrically-conducting ring on the end of said plug and member respectively engage each other, whereby the joining together of said casing, plug and member provide for an articulation in which both pneumatic and electrical systems are respectively connected together through said combination.

2. The combination of claim 1 including a second pneumatic system comprising:

a bore extending throughout said plug, and a second bore in said member adapted to be connected to a pneumatic supply source, said plug bore and second bore communicable with each other upon cooperative engagement of said casing and member in said casing bore.

3. An articulating coupling for vehicles comprising in combination:

a casing having a casing proper mountable on one vehicle, a casing bore disposed in and towards the free end of said casing, means mountable on a second vehicle cooperatively engaging the casing proper in said casing bore, a pneumatic passageway through said mountable means and casing comprising (a) a bore in said mountable means adopted to be connected to a pneumatic pressure source, (b) at least one groove extending from said casing bore longitudinally in the casing proper, (c) an annular space defined by a difference in the diameters of said casing bore and said mountable means disposed therein and extending along the casing bore to the free end of said casing, said longitudinally extending groove and annular space being communicable with each other, (d) a circular groove disposed in the casing proper above said longitudinally extending groove, (e) a bore in the casing proper terminating at its one end at the inner end of said casing and communicating with said circular groove at its other end, said longitudinally extending groove connecting said annular space and circular groove, said bore in said mountable means, annular space, longitudinally extending groove, circular groove, and bore in the casing proper constituting pneumatic conduits and forming said passageway for the pneumatic conduit system, and means for sealing said casing and mountable means for preventing leakage from said pneumatic passageway.

4. The combination of claim 3 including means for maintaining said member in physical engagement with said casing proper.

5. The combination of claim 3 including a second pneumatic system comprising:

a second bore in the casing proper, terminating at its one end at the inner end of said casing and at said casing bore at its other end, and a second bore in said mountable means communicable with said second bore in said casing at its one end and adapted to connect with a pneumatic source at its other end, said second bores constituting pneumatic conduits and forming a second pneumatic passageway in the pneumatic system upon cooperative engagement between said casing and mountable means.

6. For use between two articulating elements whereby a unit pneumatic system is made operable by joining of such elements, the combination of:

a casing having a bore therethroughout, a plug secured in said casing bore, said plug being of less length than said bore and comprising:

(a) an annular groove on said plug, and (b) at least one peripheral groove on said plug, extending longitudinally therealong, and connected with said annular groove, means cooperatively engaging said plug in said bore and comprising:

(a) a member of less diameter than the diameter of said casing bore whereby an annular space is defined in said casing bore below said plug, and (b) a bore in said member communicable at its one end with the annular space and adapted at its other end for connection to a pneumatic pressure source, the annular space communicable with the peripheral groove, the annular groove, peripheral groove, annular space, and member bore constituting conduits forming a passageway for the pneumatic system, and means for sealing said casing and member to prevent leakage from the passageway.

7. The combination of claim 6 including a second pneumatic system comprising:

a bore extending throughout said plug, and a second bore in said member adapted to be connected to a pneumatic supply source, said plug bore and second bore communicable with each other upon cooperative engagement of said casing and member in said casing bore.

8. In combination with a kingpin-and-fifth-wheel connection between a tractor and trailer unit, the combination comprising:

a kingpin having a kingpin proper mounted on the trailer, a kingpin bore disposed towards the free end of said kingpin, means mounted on the tractor cooperatively engaging the kingpin proper in its kingpin bore,
a pneumatic passageway through said mounted means and kingpin comprising:
a bore in said mounted means adapted to be connected to a pneumatic pressure source,
at least one groove extending from said kingpin bore longitudinally into the kingpin proper,
an annular space defined by a difference in diameters of said kingpin bore and said mounted means disposed therein and extending along the kingpin bore to the free end of said kingpin,
said longitudinally extending groove and annular space being communicable with each other,
a circular groove disposed in the kingpin proper above said longitudinally extending groove,
a bore in the kingpin proper terminating at its one end at the inner end of said kingpin and communicating with said circular groove at its other end,
said longitudinally extending groove connecting said annular space and circular groove,
said bore in said mounted means, annular space, longitudinally extending groove, circular groove, and bore in the kingpin proper constituting pneumatic conduits and forming said passageway for the pneumatic conduit system, and
means for sealing said kingpin and mounted means to prevent leakage from said pneumatic passageway.

9. The combination of claim 8 including means for maintaining said member in physical engagement with said plug.

10. The combination of claim 8 including a second pneumatic system comprising:
a second bore in the kingpin proper, terminating at its one end at the inner end of said kingpin and at said kingpin bore at its other end, and
a second bore in siad mounted means communicable with said second bore in said kingpin at its one end and adapted to connect with a pneumatic source at its other end,
said second bores constituting pneumatic conduits and forming a second pneumatic passageway in the pneumatic system upon cooperative engagement between said kingpin and mounted means.

11. For use between two elements whereby a unit pneumatic system is made operable by joining of such elements, the combination of:
a kingpin having a bore therethroughout,
a plug secured in said kingpin bore, said plug being of less length than said kingpin bore and comprising:
  (a) an annular groove on said plug, and
  (b) at least one peripheral groove on said plug, extending longitudinally therealong, and connected with said annular groove,
means cooperatively engaging said plug in said bore and comprising:
  (a) a member of less diameter than the diameter of said kingpin bore whereby an annular space is defined in said kingpin bore below said plug, and
  (b) a bore in said member communicable at its one end with the annular space and adapted at its other end to be connected to a pneumatic presure source,
the annular space communicable with the peripheral groove,
the annular groove, peripheral groove, annular space, and member bore constituting conduits forming a passageway for the pneumatic system, and
means for sealing said kingpin and member to prevent leakage from the passageway.

12. The combination of claim 11 including a second pneumatic system comprising:
a bore extending throughout said plug, and
a second bore in said member adapted to be connected to a pneumatic supply source,
said plug bore and second bore communicable with each other upon cooperative engagement of said kingpin and member in said kingpin bore.

References Cited
UNITED STATES PATENTS

| | | | |
|---|---|---|---|
| 994,292 | 6/1911 | Williamson | 191—12.4 |
| 2,053,614 | 9/1936 | Johnson | 280—421 |
| 2,924,464 | 2/1960 | Zajac | 280—421 |
| 3,181,887 | 5/1965 | Boylan et al. | 280—421 |
| 3,193,636 | 7/1965 | Daniels | 339—182 |

LEO FRIAGLIA, *Primary Examiner.*

U.S. Cl. X.R.

191—12.4; 280—422; 285—62; 339—5